United States Patent Office 3,657,177
Patented Apr. 18, 1972

3,657,177
WIRE ENAMEL OF AN AROMATIC POLYSULFONE
RESIN AND A HEAT REACTIVE CONDENSATE
Paul L. Adesko, Mount Prospect, Ill., assignor to E. I. du
Pont de Nemours and Company, Wilmington, Del.
No Drawing. Filed June 25, 1970, Ser. No. 49,945
Int. Cl. C08g 51/26, 51/28, 51/32
U.S. Cl. 260—30.4 R  3 Claims

ABSTRACT OF THE DISCLOSURE

A coating composition that is resistant to elevated temperatures and can be utilized as a coating for metals, as a wire enamel, as an impregnant for forming circuit boards and as a high temperature adhesive is the subject of this invention. The composition is particularly useful as an over-coat over conventional wire enamels, such as polyimides, polyamides, polyamides-imides, polyesters, polyester-amides, polyesterimides, which are utilized in the winding of motors, generators, electrical coils and the like, these over-coated wires can be fused together to form a particularly strong, temperature resistant bond between the wires. The coating composition contains as the film-forming constituent:

(A) an aromatic polysulfone resin which has the following recurring structural unit:

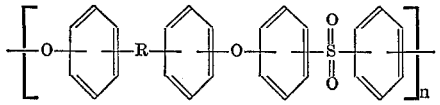

where R is alkylene radical having 1–4 carbon atoms; and
(B) a heat reactive condensate having terminal —CH₂OH groups.

BACKGROUND OF THE INVENTION

This invention relates to a coating composition that is resistant to elevated temperatures and in particular to a coating composition of a polysulfone and a heat reactive condensate.

Polysulfone polymers are well known and have been prepared by a variety of methods as shown in the following patents: Barth U.S. 3,370,107, issued Feb. 20, 1968, and Hendricks U.S. 3,423,479, issued Jan. 21, 1969. However, these polysulfone resins alone do not provide coatings which have excellent bond strengths at elevated temperatures. Epoxy/phenol formaldehyde coatings, epoxy coatings, and polyvinyl butyral coatings have been utilized as overcoats over wires coated with polyimides, polyamide-imides and polyester coatings, however, these over-coatings do not provide high bond strengths at elevated temperatures. There is a great need in the industry today for a wire over-coating that can be applied to standard, high temperature wire enamels, which when used in windings for motors, generators, coils and the like, will form a bond that will withstand elevated temperatures.

By utilizing an aromatic polysulfone resin in combination with a heat reactive condensate, a flexible, durable, tough, heat resistant coating can be formed, and these coatings are particularly useful as a wire enamel and as an over-coat on wires that have been coated with the aforementioned wire enamels. When these over-coated wires are used to form windings in electrical equipment, the wires are bonded together and the resulting composite has a high degree of thermal resistance in comparison to electrical components prepared with wires that are over-coated with standard wire enamels.

SUMMARY OF THE INVENTION

The liquid coating composition of this invention contains 5–70% by weight, based on the weight of the coating composition, film-forming constituents and 95–30% by weight, based on the weight of the coating composition, of a solvent for the film-forming constituents; wherein the film-forming constituents consist esentially of—

(A) 90–99.5% by weight, based on the weight of the film-forming constituents, of a polysulfone resin having the following recurring structural unit:

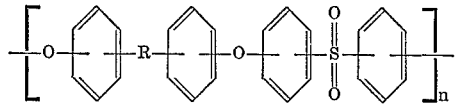

where R is an alkylene having 1–4 carbon atoms and $n$ is a positive integer sufficiently high to provide a film-forming polymer having a number average molecular weight of about 20,000 to 100,000; and correspondingly
(B) 0.5–10% by weight, based on the weight of the film-forming constituents, of a heat reactive condensate having terminal —CH₂OH groups.

DESCRIPTION OF THE INVENTION

The novel coating composition of this invention preferably contains 10–35% by weight of the film-forming constituents, and preferably, film-forming constituents consist of 92–98% by weight of the aromatic polysulfone resin, and correspondingly, 2–8% by weight of the heat reactive condensate.

The aromatic polysulfone resin of this invention has the following recurring structural unit:

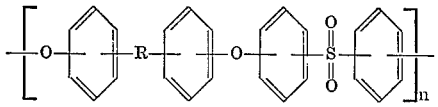

where $n$ is a positive integer, sufficiently high to provide a film-forming polymer having a number average molecular weight of 20,000 to 100,000, and preferably, 35,000 to 70,000, and where R is an alkylene radical having 1–4 carbon atoms.

The polysulfone can be prepared by reacting an arylene dihydric phenol with an aromatic sulfone resin shown in Barth U.S. 3,370,107, issued Feb. 20, 1968, and Hendricks U.S. 3,423,479, issued Jan. 21, 1969. Typical compounds that can be used to prepare the polysulfone resin are bisphenol A, or bisphenol F and 4,4' - dichlorodiphenylsulfone or di-(4 - hydroxyphenyl) sulfone. Bisphenol A is diphenylol propane which has the formula

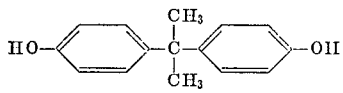

Bisphenol F is diphenylol methane which has the formula

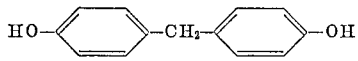

About 0.5–10% by weight, based on the weight of the film-forming constituents, of the heat reactive condensate having terminal —CH$_2$OH groups is blended with the aforementioned polysulfone resin to form the novel coating composition of this invention. The heat reactive condensates that can be used are, for example, phenol/formaldehyde, urea/formaldehyde, melamine/formaldehyde, benzoguanamine/formaldehyde and the like. One particularly useful heat reactive condensate which gives a high quality product is phenol/formaldehyde.

The process for preparing the novel coating composition of this invention comprises dissolving the polysulfone resin in a solvent for the polysulfone resin. This is accomplished preferably by heating the mixture of polysulfone resin and solvent to a temperature of about 50–100° C. Typical solvents that can be used to dissolve the polysulfone resin are cresylic acid, halogenated solvents, such as methylene chloride; N-methylpyrrolidone, dimethylacetamide, dimethylformamide, tetrahydrofuran, dioxane, acetone/toluene in a 30/70 ratio, aromatic hydrocarbon solvents and the like. After the polysulfone resin is dissolved in a suitable solvent, the heat reactive condensate is blended with the resin solution and a suitable hydrocarbon solvent is then added to dilute the coating composition to an application viscosity.

Pigments can be used in the novel coating composition in amounts of 0.1–50% pigment volume concentration. Examples of the great variety of pigments which can be used are metallic oxides, such as titanium oxides, zinc oxide, iron oxide, and the like, metal hydroxides, metal flakes, metal powders, chromates, such as lead chromate, sulfides, sulfates, carbonates, carbon black, silica, talc, china clay, iron blues, organic reds, maroons, organic dyes and lakes, and the like.

The novel coating compositions of this invention can be applied to a variety of substrates, for example, metal, wires, glass, plastics, such as polyimides, fluorocarbon polymers and the like, by any of the usual application methods, such as spraying, dipping, brushing, flow coating and the like. These coatings are baked at about 150 to 250° C. The resulting coating is about 0.1–6 mils thick, preferably, 1–3 mils thick.

The novel coating composition of this invention can be used as a wire enamel. For this use, the novel coating composition is diluted to a 20–30% polymer solids content, using a solvent, such as an aromatic hydrocarbon solvent, e.g., toluene, xylene and the like. This diluted composition is applied to a wire by using commercial wire coating equipment under ordinary coating conditions. The curing oven temperature can vary from about 100° C. at the bottom of the oven to about 500° C. at the top of the oven. The following oven conditions are useful: about 100° C. to 200° C. at the bottom and about 300° C. to 500° C. at the top of the oven. Wire coating speeds up to 100 feet per minute can be used with resulting increase in diameter of the wire of 0.1–6 mils.

The novel coating composition of this invention can be used over conventional wire coatings, such as polyamides, polyimides, polyesterimides, polyesters, polyesteramides, polyesterimides, polyamide-imides, polyurethanes and the like, to give a coating with superior electrical properties and a coating which can be bonded to itself. For example, in motors, generators, coils and the like, the wires are wound to form an electrical component. The wound wires of the component are then bonded together by heating the component at about 205–250° C. The resulting bonded component is thermally stable up to 200° C. for long periods of time. This has not been possible with standard overcoats, for example, of epoxy resin/phenol formaldehyde. For example, a metal conductor having a polymeric coating of about 0.1–5 mils thick of the above conventional enamels can be overcoated with about a 0.1–2 mil thick layer of the novel coating of this invention and provide the conductor with excellent electrical properties and provides a coating which will bond to itself and retain its bond strength at elevated temperatures.

The wound wire components can also be bonded by subjecting the component to a solvent atmosphere which will bond the wires together. Any of the aforementioned solvents can be used, such as toluene/acetone, 70/30 ratio, tetrahydrofuran, dioxane, halogenated solvents and the like. Another method that can be used to bond the overcoated wires together is to wind the wire after the wire has been wetted with a solvent and then dry the wound component. This can be accomplished, for example, by passing the wire through a felt saturated with a solvent and then winding the wire into the electrical component.

One particular cross-linked polyester wire coating over which the novel composition of this invention can be applied is a polyester of ethylene glycol, isophthalic acid, terephthalic acid, dimethyl terephthalate cross-linked with tris-(2-hydroxyethyl) isocyanurate. The combination of a layer of the novel coating composition of this invention over the above described polyester gives a high quality wire enamel with excellent electrical properties.

One particular use for the novel coating composition of this invention is to impregnate temperature resistant substrates which are used, for example, as circuit boards. The substrate is impregnated with the novel composition and heated to about 220 to 250° C. for about 5 to 30 minutes. Typical woven or non-woven substrates that can be used are of glass fibers, high temperature polyamides, polyimides, and the like. A metal foil, for example of copper or aluminum can be bonded to these impregnated sheets.

The following examples illustrate the invention.

EXAMPLE 1

The following ingredients are blended together to form a wire enamel.

| Portion 1: | Parts by wt. |
|---|---|
| Cresylic acid [1] | 272.69 |
| Polysulfone resin [2] | 199.25 |
| Portion 2: | |
| Phenol/formaldehyde condensate solution (50% solids dissolved in cresylic acid) | 21.01 |
| Portion 3: | |
| Hydrocarbon solvent (boiling point 150–190° C., aniline point 28° C.) | 251.68 |
| Hydrocarbon solvent (boiling point 182–219° C.) | 94.37 |
| Total | 839.00 |

[1] Cresylic acid—a mixture of cresols and contains 10% free phenol.
[2] Polysulfone resin has the following structural formula:

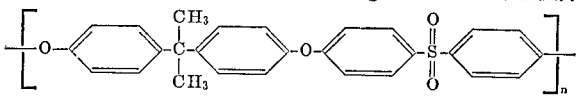

where $n$ is a positive integer sufficiently high to provide a number average molecular weight of about 50,000.

No. 18 AWG copper wire is coated with the above prepared composition using conventional wire coating equipment as described in Bullitt et al. U.S. 3,069,375, column 10, lines 48-66. A drying temperature of 110° C. at the bottom of the drying oven and 410° C. at the top of the drying oven is used and a coating speed of about 25 feet/minute is used. Four coats are applied to give a coating thickness of 1.2-1.5 mils.

The bond strength of the coated wire is determined according to ASTM-D2519-66-T which has been slightly modified. Helical coil of the wire are wound on a ¼ inch diameter rod and bonded in a vertical position by applying a 200 gram load and baking for 30 minutes at 225° C. The bond strength is tested by cutting the coil into 3 inch segments and tested by increasing the tension on the coil segment in a transverse direction from the axis of the coil until the coil broke. The test is conducted at room temperature and at 105° C., 130° C., 155° C. and 180° C. The results of the test are shown in Table I.

The aforementioned polysulfone resin is diluted to a coating viscosity using the above hydrocarbon solvents. The resulting composition is applied to a No. 18 AWG copper wire using the above procedure. The resulting wire has a coating thickness of 1.2-1.5 mils. The bond strength of this coated wire is tested using the above procedure. The results of the test are recorded in Table I. The test results show that the polysulfone coating has a substantially lower bond strength in comparison to the bond strength of the wire coated with polysulfone resin blended with the phenol/formaldehyde condensate.

A conventional epoxy/phenol formaldehyde resin using a ratio of 95/5 is coated onto a No. 18 AWG copper wire using the above procedure. This coated wire is also tested as above to determine bond strength at different temperatures. The results are in Table I. The test results show a drop in bond strength to almost zero at 130° C. and above.

EXAMPLE 2

The following ingredients can be blended together to form a wire enamel.

Portion 1: Parts by wt.
   Cresylic acid (described in Example 1) _____ 272
   Polysulfone resin (described in Example 1) __ 199
Portion 2:
   Melamine/formaldehyde condensate _____ 10
Portion 3:
   Hydrocarbon solvent _____ 350

Total _____ 831

Portion 1 is charged into a vessel and thoroughly mixed and heated to 120° C. for about 1½ hours. Portion 2 is then added and thoroughly mixed and the Portion 3 is added and thoroughly mixed.

No. 18 AWG copper wire can be coated as in Example 1 The bond strength of the wire should be similar to the bond strengths obtained in Example 1.

EXAMPLE 3

The following ingredients can be blended together to form a wire enamel.

Portion 1: Parts by wt.
   Cresylic acid (described in Example 1) _____ 272
   Polysulfone resin (described in Example 1) __ 199
Portion 2:
   Benzoguanamine/formaldehyde condensate __ 10
Portion 3:
   Hydrocarbon solvent _____ 350

Total _____ 831

Portion 1 is charged into a vessel and thoroughly mixed and heated to 120° C. for about 1½ hours. Portion 2 is then added and thoroughly mixed and then Portion 3 is added and thoroughly mixed.

No. 18 AWG copper wire can be coated as in Example 1 The bond strength of the wire should be similar to the bond strengths obtained in Example 1.

EXAMPLE 4

The following ingredients can be blended together to form a wire enamel.

Portion 1: Parts by wt.
   Cresylic acid (described in Example 1) _____ 272
   Polysulfone resin (described in Example 1) __ 199
Portion 2:
   Urea/formaldehyde condensate _____ 10
Portion 3:
   Hydrocarbon solvent _____ 350

Total _____ 831

Portion 1 is charged into a vessel and thoroughly mixed and heated to 120° C. for about 1½ hours. Portion 2 is then added and thoroughly mixed and then Portion 3 is added and thoroughly mixed.

No. 18 AWG copper wire can be coated as in Example 1. The bond strength of the wire should be similar to the bond strengths obtained in Example 1.

TABLE I

| | Wire coating | | |
|---|---|---|---|
| | Polysulfone/phenol/formaldehyde | Polysulfone | Epoxy phenol/formaldehyde |
| | Bond strength (pounds) | | |
| Test temperature, °C.: | | | |
| Room temperature | 24.5 | 12.5 | 32.0 |
| 105 | 20.4 | 13.6 | 8.6 |
| 130 | 17.2 | 15.2 | 1.2 |
| 155 | 14.0 | 12.0 | 0 |
| 180 | 12.2 | 8.4 | 0 |

I claim:
1. A coating composition comprising 5-70% by weight, based on the weight of the coating composition, of film-forming constituents and 95-30% by weight, based on the weight of the coating composition, of a solvent for the film-forming constituents, wherein the film-forming constituents consist essentially of
(A) 90-99.5% by weight, based on the weight of the film-forming constituents, of a polysulfone resin having the following recurring structural unit:

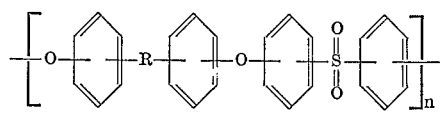

where R is an alkylene radical having 1-4 carbon atoms and $n$ is a positive integer sufficiently high to provide a film-forming polymer having a number average molecular weight of about 20,000-100,000; and correspondingly,
(B) 10-0.5% by weight, based on the weight of the film-forming constituents, of a heat reactive condensate selected from the group consisting of phenol/formaldehyde, melamine/formaldehyde, benzoguanamine/formaldehyde, urea/formaldehyde and mixtures thereof.

2. The coating composition of claim 1 in which R is

and the heat reactive condensate is phenol/formaldehyde.

3. The coating composition of claim 1 having 10-35% by weight of the film-forming constituent and
(A) 92-99% by weight of the polysulfone resin in which R is

and has a number average molecular weight of 35,000 to 70,000; and correspondingly, (B) 2–8% by weight of a heat reactive condensate of phenol/formaldehyde.

References Cited

UNITED STATES PATENTS

| | | | |
|---|---|---|---|
| 2,060,715 | 11/1936 | Arvin | 260—2 |
| 3,332,909 | 7/1967 | Farnham et al. | 260—47 |
| 3,355,272 | 11/1967 | D'Alessandro | 260—838 |
| 3,370,107 | 2/1968 | Barth | 260—901 |
| 3,423,479 | 1/1969 | Hendricks | 260—824 |
| 3,455,868 | 7/1969 | D'Alessandro | 260—849 |
| 3,526,677 | 9/1970 | Oahms et al. | 260—33.4 P |
| 3,555,113 | 1/1971 | Sattler | 26—33.4 P |

OTHER REFERENCES

Union Carbide Bulletin, "Bakelite" Phenoxy Resin PKHH, July 1968, 2 pages.

Union Carbide Bulletin, "Bakelite" Phenoxy Primers, October 1965, 7 pages.

Union Carbide Bulletin, "Bakelite" Phenoxy Resins PKHH and PAHJ for solution coating and Adhesives, 12 pages.

ALLAN LIEBERMAN, Primary Examiner

U.S. Cl. X.R.

260—30.2, 30.4 N, 32.6 R, 32.6 N, 32.8 R, 33.6 R, 33.8 R, 838, 849